United States Patent [11] 3,604,971

[72] Inventor Robert A. Tracy
Mountain View, Calif.
[21] Appl. No. 846,105
[22] Filed July 30, 1969
[45] Patented Sept. 14, 1971
[73] Assignee The Singer Company
New York, N.Y.

[54] FILAMENT MOUNTING STRUCTURE FOR DISPLAY DEVICE
7 Claims, 16 Drawing Figs.

[52] U.S. Cl. .......... 313/109.5, 315/64, 313/272
[51] Int. Cl. .......... H01k 9/00, H01k 1/42, H01i 1/28
[50] Field of Search .......... 313/109.5, 108 R; 315/64, 66, 68, 69

[56] References Cited

UNITED STATES PATENTS

| | | | |
|---|---|---|---|
| 1,572,521 | 2/1926 | Fehler | 313/109.5 |
| 3,302,052 | 1/1967 | Schwab | 313/109.5 |
| 3,327,154 | 6/1967 | Bowerman | 313/109.5 |
| 3,512,028 | 5/1970 | McNaney | 313/109.5 |

*Primary Examiner*—Robert Segal
*Attorneys*—Patrick J. Schlesinger, Charles R. Lepchinsky, Warren P. Kujawa and Jay M. Cantor

ABSTRACT: A filament display device which is suitable for use as a readout device for a wide variety of electronic devices, especially those utilizing integrated circuits, employs a plurality of incandescent filaments arranged to form a character array. In one embodiment, a character array is formed by bonding each character segment to different ends of a preformed lead assembly. In another embodiment, the array is constructed by building up the leads and filaments by the electroforming technique. After forming the character array, it is placed in an enclosure which is then evacuated and backfilled slightly with an inert atmosphere. A plurality of such arrays can be simultaneously constructed and then enclosed in a single package to form an entire display panel.

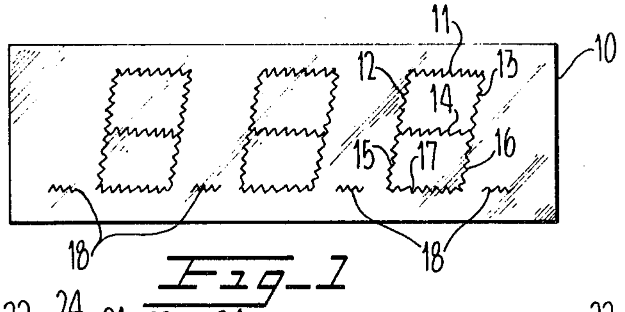
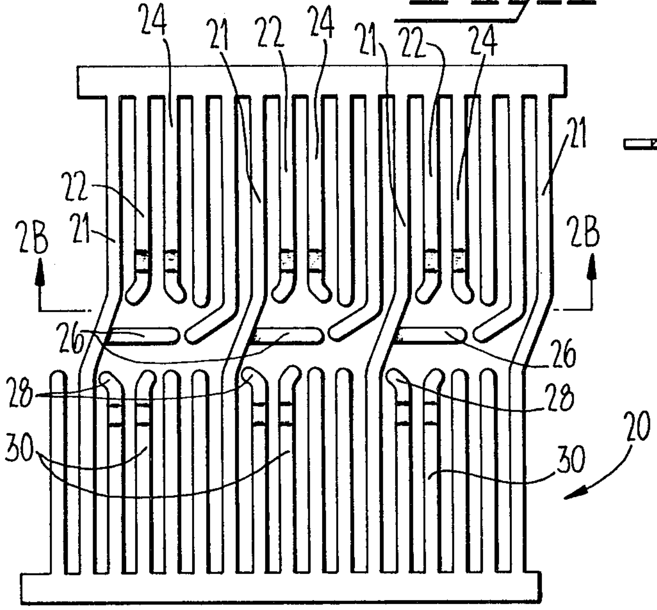
Fig. 2A
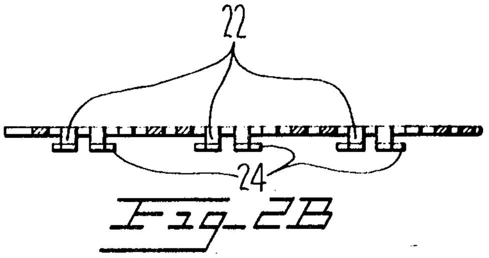
Fig. 2B
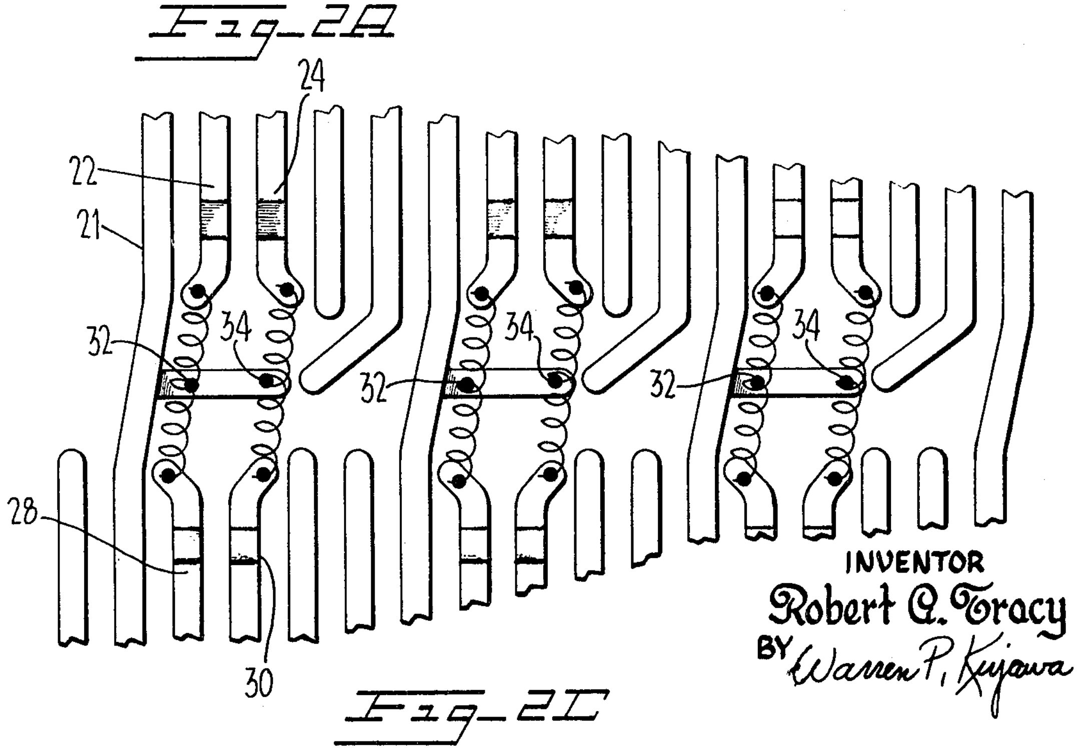
Fig. 2C
INVENTOR
Robert Q. Tracy
BY Warren P. Kujawa
AGENT

FILAMENT MOUNTING STRUCTURE FOR DISPLAY DEVICE

BACKGROUND OF THE INVENTION

1. Field of the Invention

This invention relates to display devices using incandescent filaments which glow when subjected to an electric current and which are used in electronic computers, office machines, such as electronic calculators, test instruments such as digital volt meters, process controls, consumer electronics, and the like.

2. Description of the Prior Art

Several types of incandescent character display devices are known in the prior art. One such device comprises a gas discharge tube having a plurality of separate cathodes in the shape of the cardinal numbers 0–9. The cathodes are arranged parallel and tandem and then enclosed in a glass envelope to form an hermetically sealed enclosure with electrically conducting leads extending through one end of the envelope. In operation, any one of the cardinal numbers can be displayed by connecting the proper leads to a source of electrical voltage. Such an arrangement suffers from the disadvantage of having a relatively narrow viewing angle due to the tandem arrangement of the numerical filaments. Further, the voltage and current requirements of such a device are substantially higher than those typically found in electronic instruments utilizing integrated circuits. Thus, to render a gas discharge character display tube compatible with many types of electronic apparatus, a separate power supply must be provided which results in an undesirable increase in design problems and production and maintenance costs.

Another known type of character display device, such as that disclosed in U.S. Pat. No. 3,408,523, utilizes a plurality of filaments, the ends of which are welded to posts which provide mechanical support and electrical contact for the filaments. The posts, which are constructed from electrically conducting material, pass through the base of an enclosure surrounding the filaments. The filaments are arranged in a universal character array, which in the case of a numerical array, comprises a figure eight with square corners. In operation, selected ones of the filaments are connected through the support pins to a source of electrical current, the passage of electrical current through the selected filaments of the character array causing those filaments to glow, thereby forming the desired numeral. A 7, for example, is displayed by causing the top horizontal filament and the right vertical filaments to incandesce. Such a device can be constructed to operate from the relatively low voltages and currents required by integrated circuits.

SUMMARY OF THE INVENTION

The present invention comprises an improved, compact character display device having good brightness, high reliability and long life, and which is compatible with integrated circuits in voltage, current, and power level. The display device employs filaments, the ends of which are bonded to selected ends of a plurality of leads to form one or more character arrays. In a first embodiment, the filaments are bonded to selected ends of a preformed lead assembly. In a second embodiment, first the leads and then the filaments are built up on an insulated base by the electroforming technique. The character array and adjacent lead portions are then enclosed and the resulting enclosure is evacuated and then partially backfilled with an inert gas. The resulting device can be used to display any one of a number of desired characters by connecting various filaments through their respective leads to a suitable power supply. Since a number of character arrays may easily be constructed at the same time and placed in the same enclosure, the inexpensive display device disclosed herein is ideally suited for use in a wide variety of electronic devices.

BRIEF DESCRIPTION OF THE DRAWINGS

For a fuller understanding of the nature and advantages of the invention, reference should be had to the following detailed description, taken in conjunction with the accompanying drawings in which:

FIG. 1 is a front view of a filament display panel embodying the invention;

DESCRIPTION OF THE PREFERRED EMBODIMENT

Figure 2F:
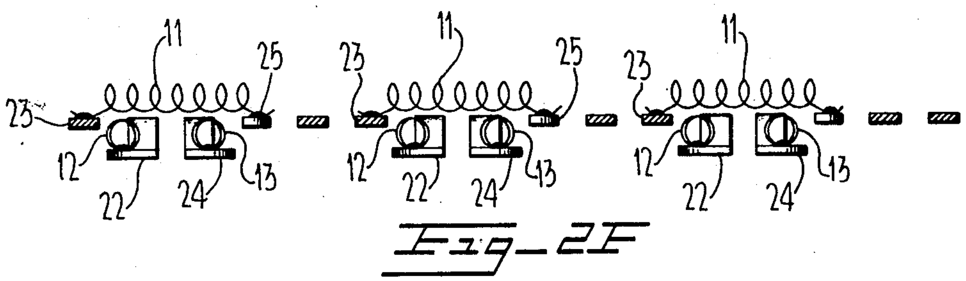
FIGS. 2A–E illustrate the several stages of construction of a filament lead assembly of a first specific embodiment.

FIG. 1 is a front view illustrating the general appearance of a filament display panel 10 embodying the invention. Display panel 10, depicted as having a glass faceplate, contains three similar cardinal numeral arrays, with each array consisting of seven separate numeral filaments 11–17 and decimal filament 18. The filaments 11–18 are connected to a number of leads in a manner set out more fully hereinbelow, the leads in turn being connected to a source of electrical current. Each of the filaments 11–18 can be caused to glow by passing electrical current therethrough; thus, by causing selected ones of the filaments 11–17 to glow simultaneously, any one of the cardinal numerals zero to nine can be represented. The numeral zero, for example, is produced by causing filaments 11, 12, 13, 15, 16 and 17 to incandesce; the numeral one by filaments 13 and 16; two by filaments 11, 13, 14, 15, and 17; three by filaments 11, 13, 14, 16, and 17; four by filaments 12, 13, 14, and 16; five by filaments 11, 12, 14, 16, and 17; six by filaments 11, 12, 14, 15, 16, and 17; seven by filaments 11, 13, and 16; eight by filaments 11–17; and nine by filaments 11, 12, 13, 14, 16, and 17. Also, a decimal point can be produced on either side of any of the numerals by causing the proper decimal filament 18 to incandesce.

FIGS. 2A–F illustrate a first construction for the filament display panel of FIG. 1. FIG. 2A shows a lead assembly 20 used to provide support for the filaments and to provide electrical connection between the filaments and the electrical current source. Lead assembly 20 may be constructed of any suitable material—such as Kovar or nickel—which is a good electrical conductor, will bond well to the filament material (specified below), and has a melting point above 800° C. Lead assembly 20 may be formed in any one of a number of ways known to those skilled in the art, as for example, by stamping from a sheet of metal.

Alternatively, the lead assembly may be constructed by the photoetching technique. In this process, a suitable photoresist, e.g. Kodak KPR-2, KPR-3, KDR, or KMER, is applied to both sides of a sheet of Kovar or nickel and exposed to a positive light image of the desired lead pattern. During exposure, that portion of the photoresist subjected to the light polymerizes. The remaining unexposed portion of the photoresist is then washed away and the entire sheet of metal is brought into contact with a suitable etching solution such as dilute nitric acid, $HNO_3$. After the exposed portions of the metal sheet have been completely etched away, the assembly is removed from the etching solution, washed, and the polymerized photoresist is stripped from the now-formed lead assembly.

Lead assembly 20 may also be produced by the electroforming technique which proceeds as follows. Photoresist is applied to a suitable conductive substrate such as a glass sheet coated with chromium and exposed to a negative light pattern of the desired lead assembly. After exposure, the nonpolymerized photoresist is washed away, after which a suitable metal, e.g. nickel, is deposited to the desired thickness on the exposed chromium layer of the substrate. The polymerized photoresist is then stripped away and the now-exposed portions of the chromium layer are etched away by a suitable etching solution, e.g. hydrofluoric acid, HF. The completed lead assembly is then removed from the glass base.

During stamping, or after the last step in the above-described photoetching and electroforming techniques, portion 26 of central bus 21 and leads 22, 24, 28, and 30 are bent away from the plane of the remaining leads so that their end portions lie in a second plane substantially parallel to the first plane, as shown in FIG. 2B. This step ensures that the horizontal filaments when attached—will not come into physical contact with the vertical filaments at the points where they cross. The lead assembly 20 is now ready for the attachment of the filaments.

The filaments are constructed from a material which is stable at high temperatures, possesses high resistivity, and bonds well to the above-described lead material. Nichrome, tungsten, and tantalum wire have been found to be suitable filament materials, particularly when wound in a double helix. The filaments are attached to the respective lead ends in two groups, the first group consisting of all vertical filaments as shown in FIG. 2C. Each vertical filament is produced by welding a length of filament wire to the end portion of an upper and lower lead, and central bus lead 21. For example, the vertical filament to the extreme left of FIG. 2C is welded to the end portion of leads 22 and 28, and to portion 32 of central bus 21. The next vertical filament to the right is welded to the end portion of leads 24 and 30 and to portion 34 of central bus 21, etc. During this step, it is not necessary that the vertical filaments be of an exact length before welding, since any excess filament wire extending above and below the upper and lower welds, respectively, can be trimmed after bonding.

Figure 2D:
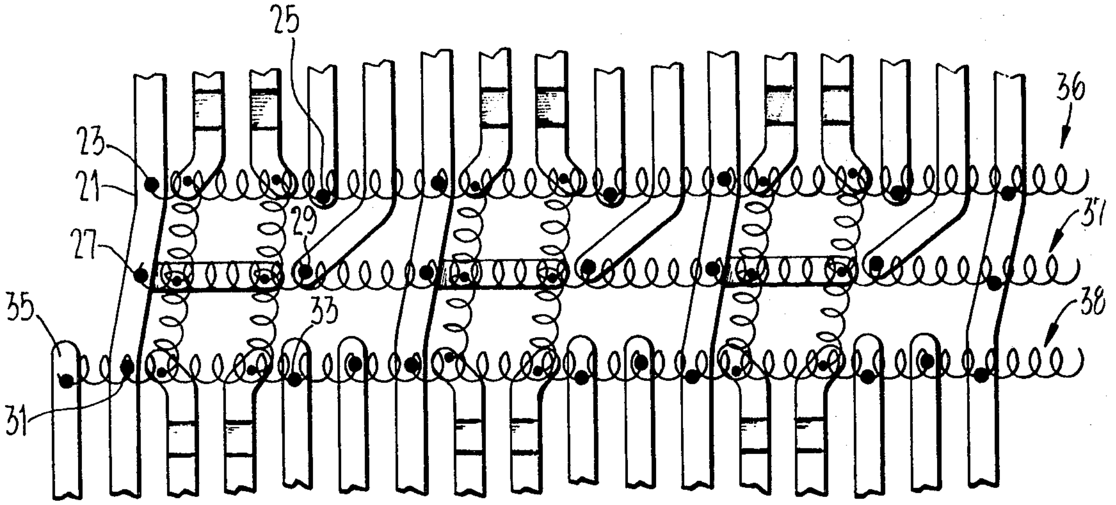
Figure 2E:
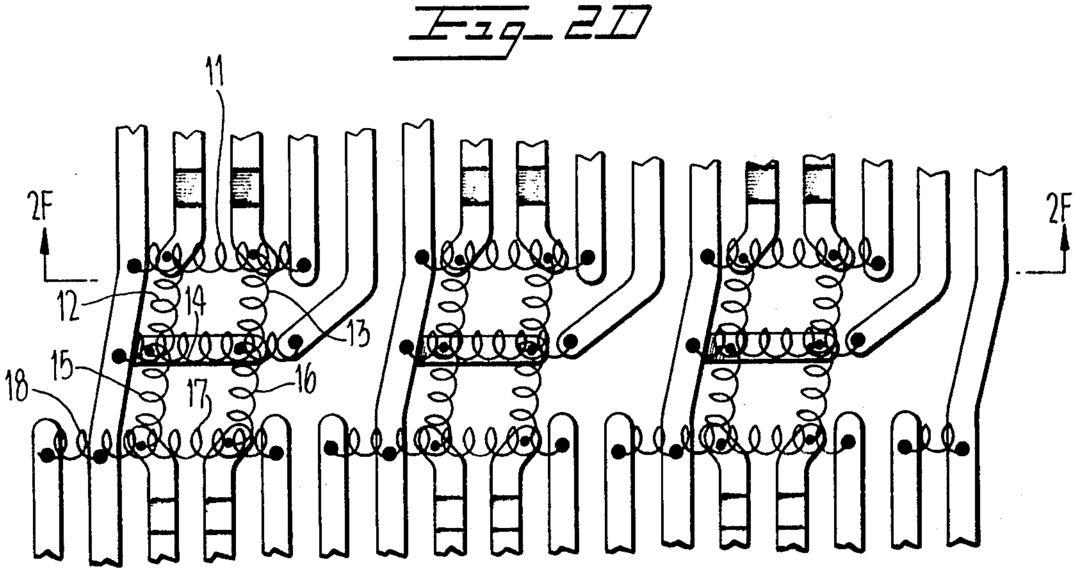

After all the vertical filaments have been attached, filaments 11 of the character arrays are formed are shown in FIG. 2D by placing filament wire 36 across the lead assembly and welding it to portions 23 of the central bus 21 and to the end portion of leads 25, it being remembered that portions 23 and the ends of leads 25 are all coplanar. Next, filaments 14 are formed by welding the filament wire 37 to portions 27 of the central bus 21 and to the end portion of leads 29. Filaments 17 and 18 are then formed by welding filament wire 38 to portions 31 of central bus 21 and to the end portion of leads 33 and 35.

After all the horizontal filaments, including the decimal point filaments, have been attached, the intermediate or between-filament sections of the filament wire are removed by any suitable means such as clipping. The resulting construction, shown in FIG. 2E, has three numerical character arrays, each consisting of three horizontal filaments 11, 14, and 17 and four vertical filaments 12, 13, 15, and 16, along with four decimal point filaments 18. As shown in FIG. 2F for filaments 11, 12, and 13, the vertical filaments are supported in a second plane located slightly below the plane of the horizontal filaments to prevent contact between the filaments at their point of intersection. This is necessary to prevent undesired current paths from causing erroneous readings during use of the device. Since the separation distance between the two planes is very small compared with the size of the incandescent numerical characters, however, all display filaments appear to the viewer to be coplanar.

Figure 4:
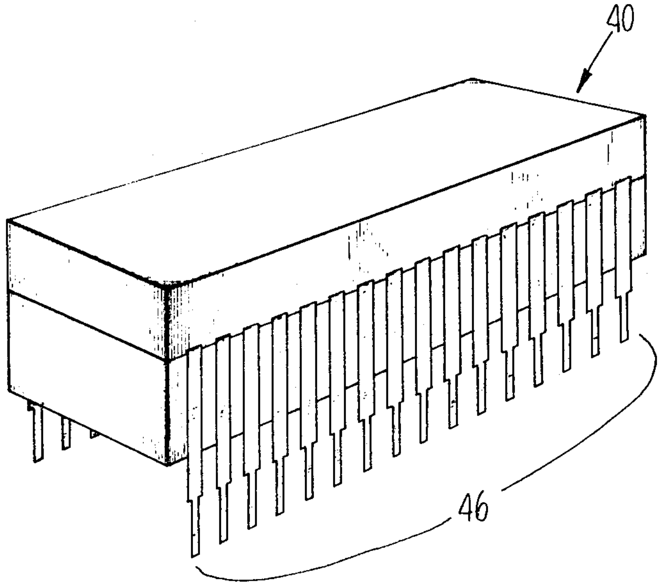
FIG. 4 is a perspective view of the assembled first embodiment.

After the filament lead assembly has been completed, it is placed in enclosure package 40 consisting of translucent or transparent glass-top member 41 and bottom member 42 formed of ceramic, glass, or a metal coated with an insulator along the top rim portion thereof. The junction formed by those portions of top member 41, bottom member 42, and the completed filament lead assembly which are in mutual contact is then sealed in any suitable manner known to those skilled in the art, such as heating, to enclose the filaments and their adjacent leads in an air tight chamber. The chamber is then evacuated through tube 44 and backfilled slightly with an inert gas, such as Argon or Krypton, after which tube 44 is sealed. As a final step in the assembly, those portions 46 of the leads extending outside of the enclosure package 40 are bent toward the base, clipped to an appropriate length, and if desired, tapered to form a plug-in unit as shown in FIG. 4.

To ensure an hermetic seal along the above-mentioned junction, the rim portions of top member 41 and bottom member 42 and the lead assembly are constructed of materials having matching coefficients of thermal expansion. For a Kovar or nickel lead assembly, glass frit is good matching material since its coefficient of thermal expansion can be varied over the required range by modifying the composition of the frit.

FIGS. 5 to 11 illustrate a second construction for the filament display panel of FIG. 1 in which the filament lead assembly is formed on an insulated base by the electroforming technique. In this construction, first the lead pattern and then the filament pattern are formed. FIGS. 5A–F illustrate the manner in which a nickel lead pattern is formed using a negative of the desired lead pattern. The first step, shown in FIG. 5A, consists of coating a glass or ceramic substrate 50 with an electrically conducting layer of chromium 51. Chromium layer 51 is then coated with photoresist 52 such as KMER (FIG. 5B). Photoresist layer 52 is then exposed to a negative light image of the desired lead pattern which polymerizes portions 53 of photoresist 52 (FIG. 5C). The next step in the process, illustrated in FIG. 5D, is to wash away the unexposed photoresist 54, thereby exposing the surface of portions of chromium layer 51 corresponding to the desired lead pattern. Nickel 55 is then plated to the desired thickness over the exposed chromium portions (FIG. 5E), after which the polymerized photoresist 53 is stripped away (FIG. 5F). After this last step, which results in a pattern of nickel leads 55 on top of chromium layer 51, the assembly is ready for formation of the filament pattern.

Alternatively, a nickel lead pattern may be formed using a positive image of the desired pattern as shown in FIGS. 6A–G. In this process, as in the previously described process, the first step consists of coating a glass or ceramic substrate 60 with an electrically conducting layer of chromium 61 (FIG. 6A). Next, a layer of nickel 62 is plated onto chromium layer 61 to the desired lead thickness (FIG. 6B), after which the nickel layer is coated with photoresist 63 (FIG. 6C). The photoresist layer 63 is then exposed to a positive light image of the desired lead pattern, thereby polymerizing exposed portions 64 of the photoresist layer 63 (FIG. 6D). The surface is then washed which removes the nonpolymerized portions of the photoresist (FIG. 6E). A suitable etching solution, such as dilute nitric acid, $HNO_3$, is then applied to the exposed nickel surface and allowed to remove all the nickel not corresponding to the desired lead pattern down to the chromium surface 61 (FIG. 6F), after which the polymerized photoresist 64 is stripped away (FIG. 6G) which results in the desired lead pattern.

Figure 5:
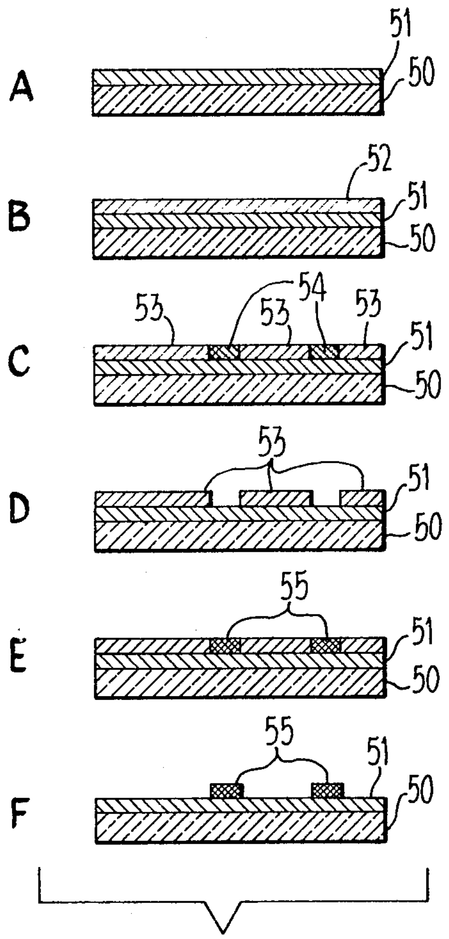
FIGS. 5A–F represent a cross-sectional view illustrating the formation of the lead assembly of a second embodiment.
Figure 6:
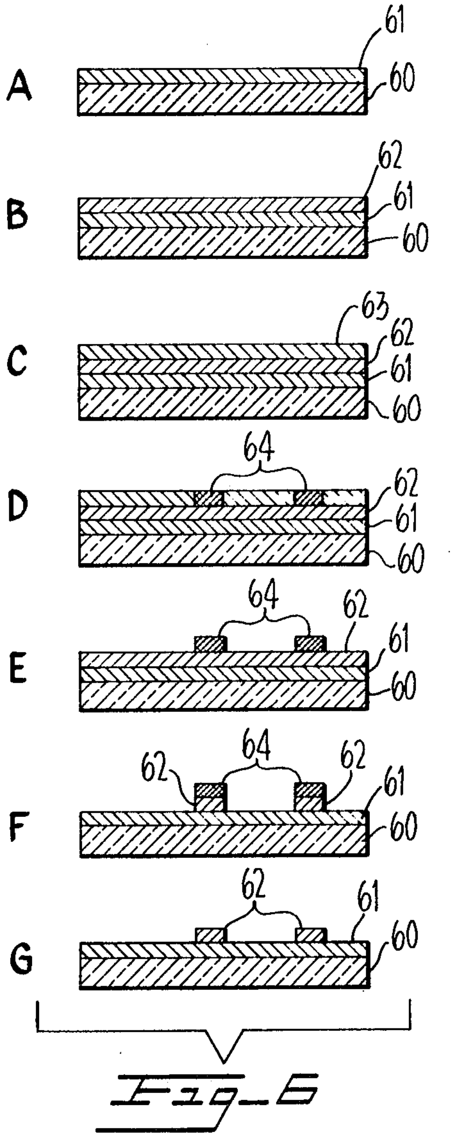
FIGS. 6A–G represent a cross-sectional view illustrating an alternate formation of the lead assembly of the second embodiment.
Figure 7:
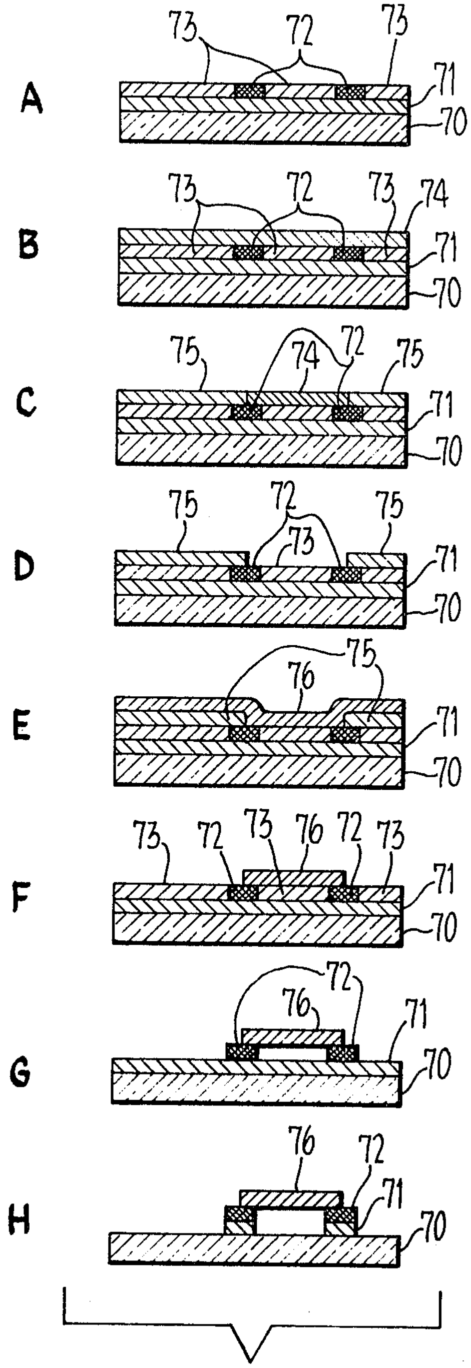
FIGS. 7A–H represent a cross-sectional view illustrating the formation of the filaments of the second embodiment.
Figure 8:
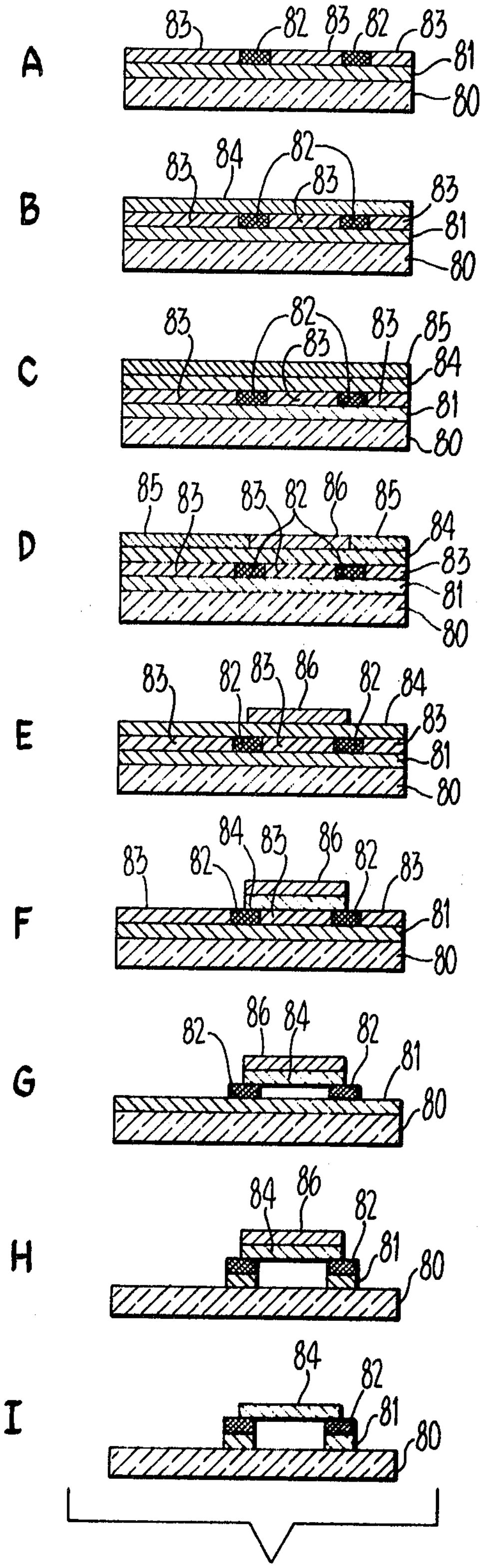
FIGS. 8A–I represent a cross-sectional view illustrating an alternate formation of the filaments of the second embodiment.

FIG. 7A–H illustrates the manner in which a character array of tungsten filaments may be formed on the lead assembly prepared according to FIGS. 5 or 6. Firstly, copper is plated to the exposed portions of chromium layer 71 to the same thickness as nickel lead portions 72 to form a bimetallic surface 72, 73 (FIG. 7A). This bimetallic surface is then coated with photoresist 74 (FIG. 7B) after which the photoresist 74 is exposed to a negative light image of the desired filament pattern, thereby polymerizing exposed portions 75 of this layer (FIG. 7C). The nonpolymerized photoresist 74 is then washed away, thereby exposing portions of the bimetallic surface 72, 73 corresponding to the desired filament pattern (FIG. 7D), after which tungsten 76 is sputtered onto the entire surface to the desired filament thickness (FIG. 7E). Next, those portions of the tungsten 76 overlying the polymerized photoresist 74 and corresponding to nonfilament regions are removed by stripping away the polymerized photoresist 74 (FIG. 7F). The copper portion 73 of the resulting exposed bimetallic layer is then etched away with a suitable copper-etching solution, such as concentrated nitric acid, $HNO_3$, which leaves nickel leads 72 unaffected (FIG. 7G) after which those portions of chromium layer 71 not located directly beneath nickel leads 72 are etched away by a chromium-etching solution, such as hydrofluoric acid, HF (FIG. 7H). The resulting completed filament lead assembly consists of tungsten filaments 76 suspended at either end by nickel leads 72 located on chromium lead supports 71 which in turn are supported by nonconductive base 70.

FIGS. 8A–I illustrate the manner in which a filament lead assembly having Nichrome filaments may be formed on the lead assembly prepared according to FIG. 5 or FIG. 6 using a positive filament pattern. As in the FIG. 7 process described above, the first step in the construction of the Nichrome filament lead assembly is to plate copper over the exposed portions of chromium surface 81 to the same thickness as nickel leads 82, thereby forming a bimetallic surface 82, 83 (FIG. 8A). Next, a layer of Nichrome 84 is plated over bimetallic surface 82, 83 to the desired filament thickness (FIG. 8B), after which the resulting Nichrome surface 84 is coated with photoresist 85 (FIG. 8C). Photoresist layer 85 is then exposed to a positive light image of the desired filament pattern, thereby polymerizing exposed areas 86 of the photoresist surface (FIG. 8D), after which the nonexposed portions 85 of the photoresist layer are washed away, thereby exposing portions of Nichrome surface 84 not corresponding to the desired filament pattern (FIG. 8E). These portions of Nichrome surface 84 are then etched away with a suitable Nichrome etching solution, such as hydrochloric acid HCl (FIG. 8F), after which copper portions 83 of bimetallic surface 82, 83 are etched away by a copper-etching solution, such as concentrated nitric acid, $HNO_3$, until chromium layer 81 is exposed (FIG. 8G). Those portions of chromium layer 81 not underlying the nickel leads 82 are next etched away by a suitable chromium-etching solution, such as hydrofluoric acid HF (FIG. 8H), after which the remaining polymerized photoresist 86 is stripped away (FIG. 8I). The resulting construction consists of an array of Nichrome filaments 84 suspended at either end by nickel leads 82 located on chromium lead supports 81 which in turn are supported by nonconductive base 80.

Figure 9:
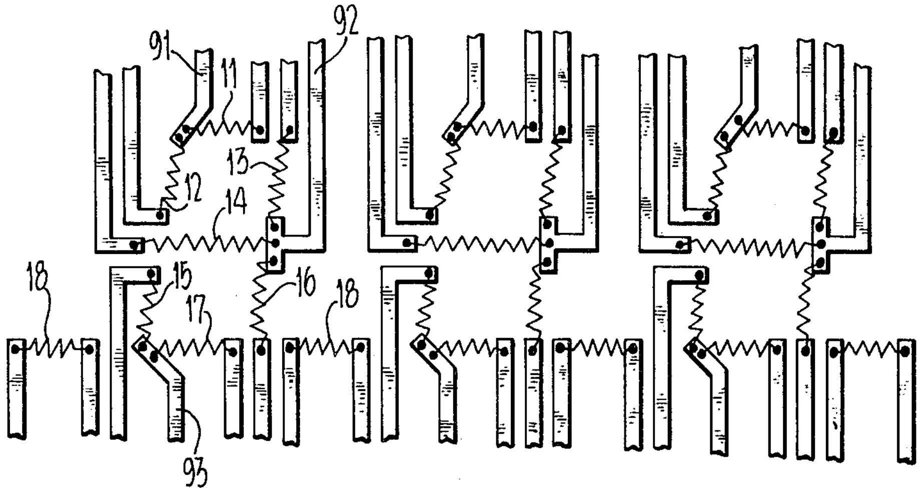
FIG. 9 is a plan view illustrating the lead pattern and filament connections of the second embodiment.

FIG. 9 shows the completed filament lead assembly constructed according to the electroforming technique and illustrates the lead pattern and filament connections utilized. Filaments 11 and 12 have a common junction at the end of lead 91; filaments 13, 14, and 16 have a common junction at the end of lead 92; and filaments 15 and 17 have a common junction at the end of lead 93. The remaining ends of filaments 11–17 and of filaments 18 are connected to individual leads. This arrangement enables any one of filaments 11–18 to be individually actuated by the passage of electrical current therethrough. It is understood that the lead pattern and filament interconnections illustrated in FIG. 9 are not unique and that other equivalent arrangements may be employed.

Figure 10:
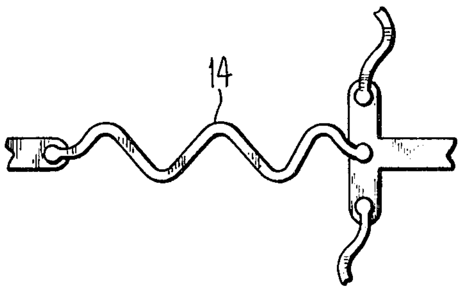
FIG. 10 is an enlarged view of a filament of the second embodiment.
Figure 11:
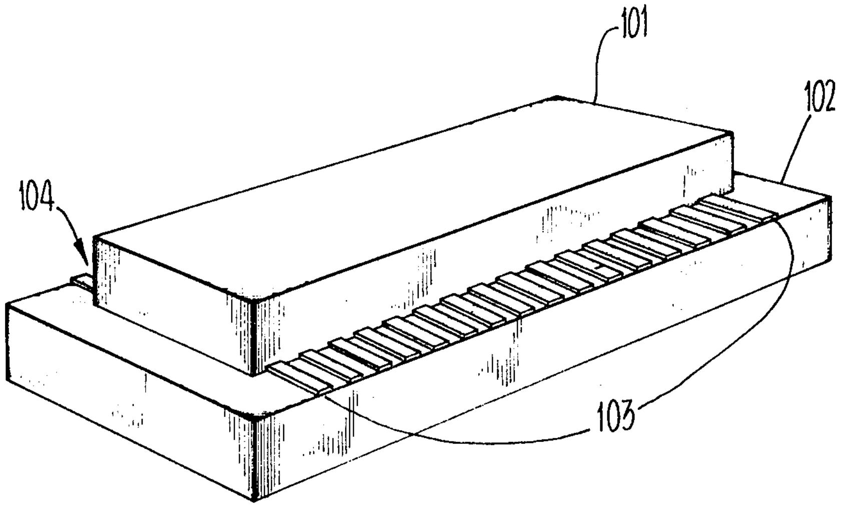
FIG. 11 is a perspective view of the assembled second embodiment.

FIG. 10 is a close up view of filament 14 illustrating the serpentine shape of a deposited filament utilized in the preferred embodiment. This serpentine shape ensures that any mechanical stresses caused by expansion of filament 14 when heated will be taken up along the sinuous length thereof, which substantially reduces the probability of filament breakage after long continued use.

Figure 3:
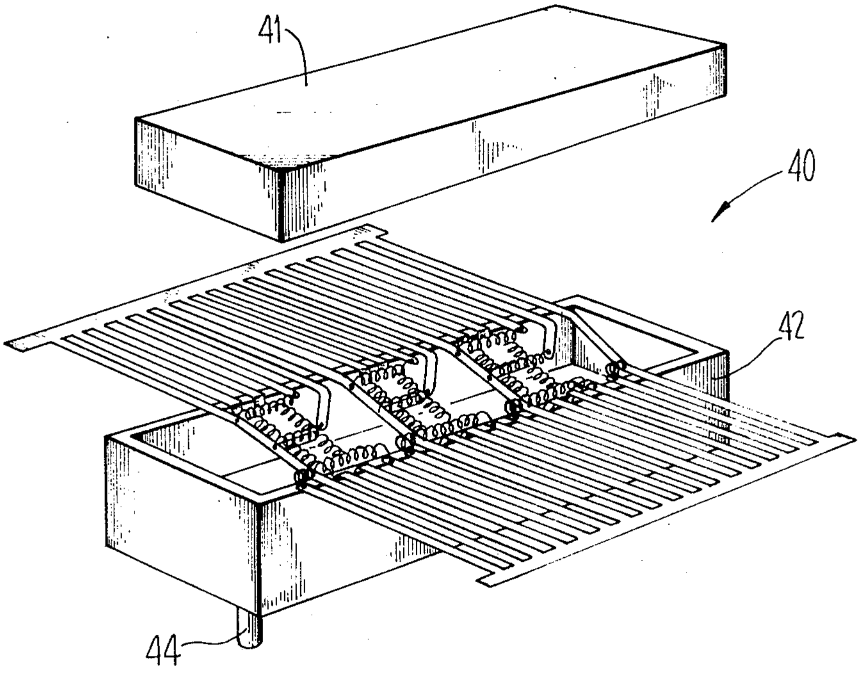
FIG. 3 is an exploded view of the first embodiment showing the relation of the various elements.

After the filament lead assembly has been completed, it is encapsulated by placing a transparent glass top 101 over base 102, and sealing the junction formed by those portions of top member 101 and bottom member 102 which are in mutual contact in a suitable manner known to those skilled in the art, such as applying a sealant of glass frit along the junction. The chamber so formed may then be evacuated in a manner similar to that already discussed in conjunction with FIG. 3 via an evacuation tube (not shown) and partially filled with an inert gas. Electrical connections to the character arrays can then be made in any suitable manner via leads 103 and 104 extending outside the enclosure.

The above-described filament display panel can be driven by a power supply having a voltage less than 15 volts and a current of less than 50 milliamps, and thus is ideally suited for use in a wide variety of applications, especially in those electronic devices using integrated circuits which typically have voltage and current requirements of the same order of magnitude. While a three-digit numerical display panel has been disclosed above, it is understood that this is an arbitrary number of digits and that other filament display panels having different numbers of digits may be constructed within the scope of this invention. It is further understood that not only numerical but also alphabetical and other symbolic types of character arrays may be constructed according to this invention.

What is claimed is:

1. A sealed character display device of the incandescent filament type comprising:

- an electrically nonconductive base member having an upper portion with a substantially planar peripheral rim surface and a central surface portion;
- a top member having a peripheral flange extending in the direction of said rim surface, said top member having a translucent face portion;
- said peripheral rim surface and said peripheral flange being joined to form a sealed enclosure;
- a plurality of electrically conductive leads disposed partially within said enclosure between said top and base portions and adapted to be coupled to a potential source;
- a plurality of serpentine incandescent-type filaments arranged in substantially a single plane and electrically connected to the ends of said leads located within said enclosure to define a character array, said filaments being solely supported by said leads and suspended above said control surface portion of said base member within said enclosure;
- the portions of said leads disposed within said enclosure being arranged in a plane substantially parallel to said single plane and extending through the junction formed by said peripheral rim surface and said peripheral flange in sealing relation therewith.

2. The apparatus of claim 1 wherein said leads comprise a material selected from the group consisting of Kovar and nickel.

3. The apparatus of claim 1 wherein said filaments comprise a substantially helically formed wire comprising a material selected from the group consisting of Nichrome, tantalum, and tungsten.

4. The apparatus of claim 1 wherein said peripheral portions of said base and top portions are constructed from materials having a matched coefficient of thermal expansion.

5. The apparatus of claim 1 including a plurality of sets of said leads and said filaments, said filaments being arranged in substantially a single plane with corresponding filaments from all sets aligned to form a plurality of character arrays, and the portions of said leads disposed within said enclosure being arranged in a plane substantially parallel to said single plane.

6. The apparatus of claim 5 wherein the externally extending portions of at least two of said leads are bent through a predetermined angle and clipped to substantially the same length.

7. The apparatus of claim 1 wherein said plurality of filaments comprises an electroformed serpentine ribbon comprising a material selected from the group consisting of nichrome and tungsten.